United States Patent [19]

Cawley et al.

[11] Patent Number: 4,787,810
[45] Date of Patent: Nov. 29, 1988

[54] METHOD AND APPARATUS FOR HANDLING STACKS OF LOOSE SHEET MATERIAL

[76] Inventors: Wesley D. Cawley; Clifton M. Cawley, both of 721 Grigsby Dr., Port Neches, Tex. 77651

[21] Appl. No.: 92,930

[22] Filed: Sep. 4, 1987

[51] Int. Cl.$^4$ .......................... B66F 9/14; B66F 9/18; B66F 9/19
[52] U.S. Cl. ..................................... 414/591; 414/42; 414/71; 414/110; 414/622; 414/672; 414/917
[58] Field of Search ................. 414/591, 622, 626, 82, 414/83, 84, 917, 785, 786, 662, 663, 664, 672, 42, 70, 71, 11 D

[56] References Cited

U.S. PATENT DOCUMENTS

| | | | |
|---|---|---|---|
| 3,272,364 | 9/1966 | Mindrum et al. | 414/622 |
| 4,383,788 | 5/1983 | Sylvander | 414/907 X |
| 4,505,635 | 3/1985 | Shinoda et al. | 414/607 X |

FOREIGN PATENT DOCUMENTS

| | | | |
|---|---|---|---|
| 2300689 | 7/1974 | Fed. Rep. of Germany | 414/785 |
| 226267 | 8/1985 | German Democratic Rep. | 414/626 |
| 11561 | 1/1977 | Japan | 414/785 |
| 112234 | 7/1982 | Japan | 414/42 |

Primary Examiner—Robert J. Spar
Assistant Examiner—Gary Cundiff
Attorney, Agent, or Firm—Fulbright & Jaworski

[57] ABSTRACT

A movable body having a pair of parallel arms supported from the body and in turn supporting a pair of forks for movement for engaging and releasing the bottom of a stack of sheet material. A clamp is movably connected to the body above the forks for engaging the top of the material and holding the material between the clamp and the extended forks. A probe lifter is movably connected to the body and movable between a lower position below the forks and an upper position between the extended forks for removing the weight of the stack from the forks for allowing the forks to be retracted.

5 Claims, 4 Drawing Sheets

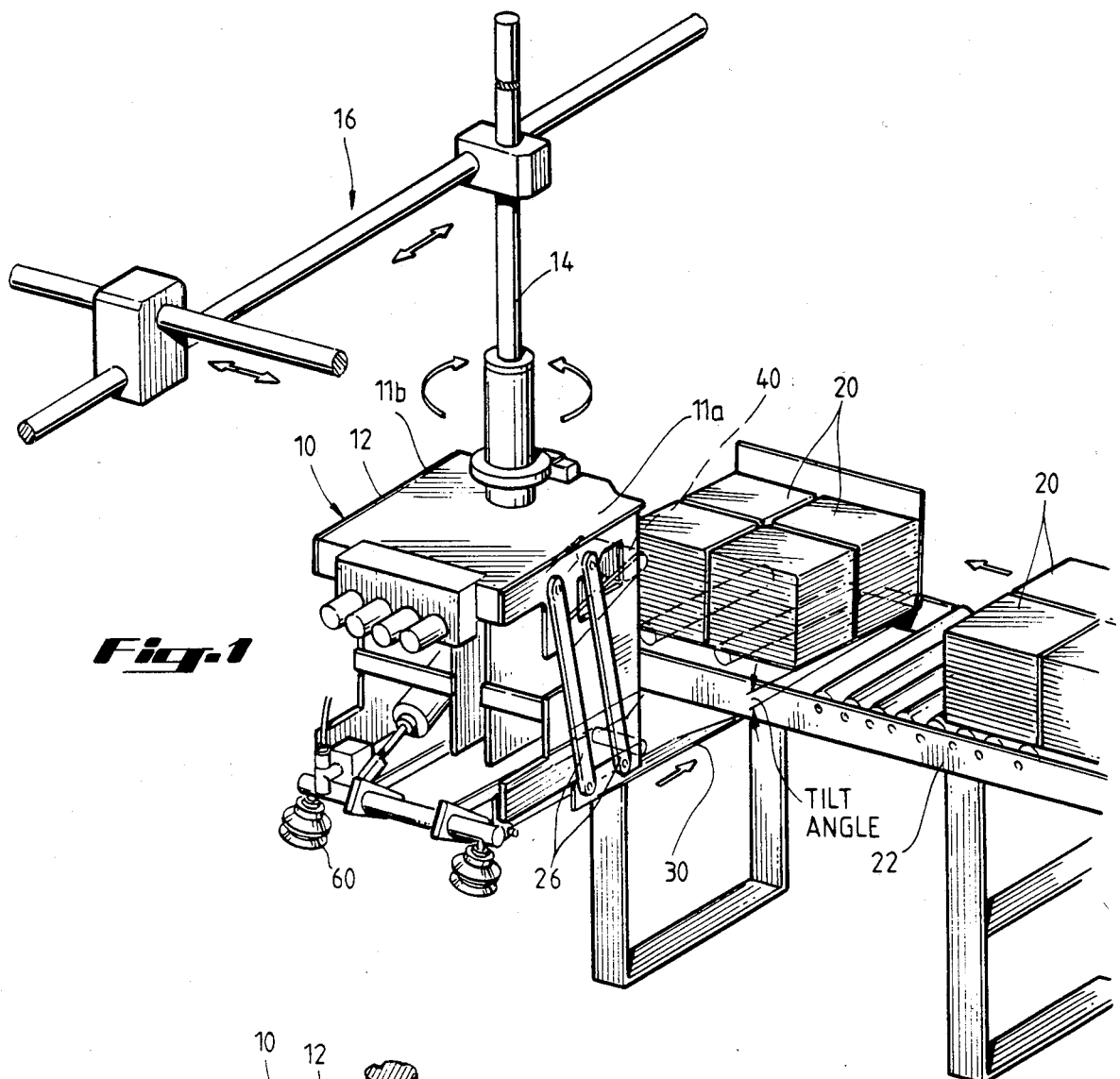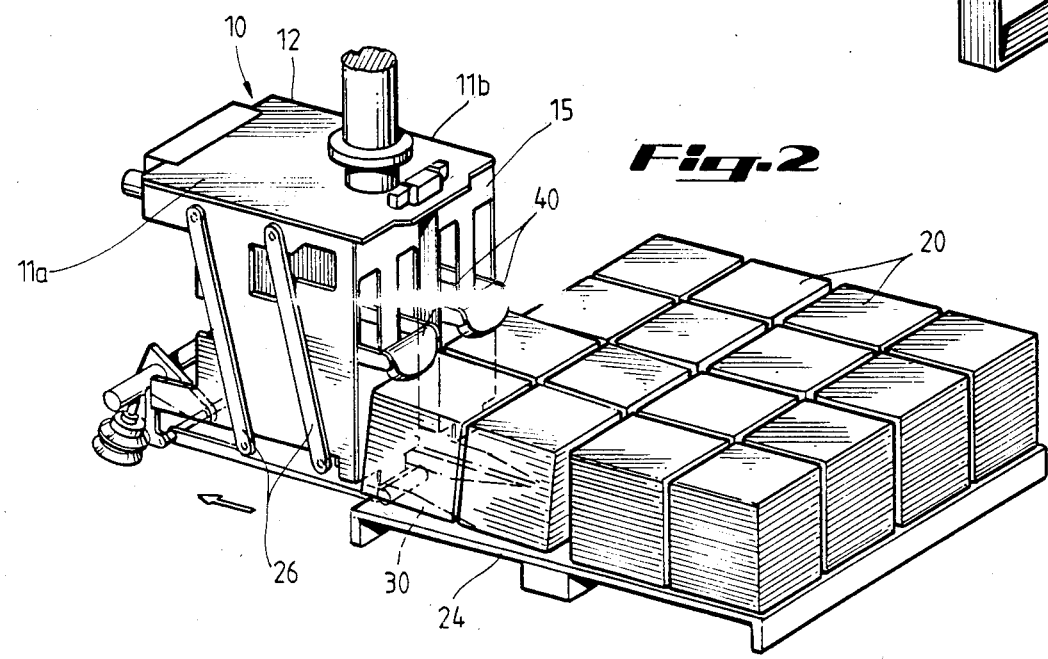

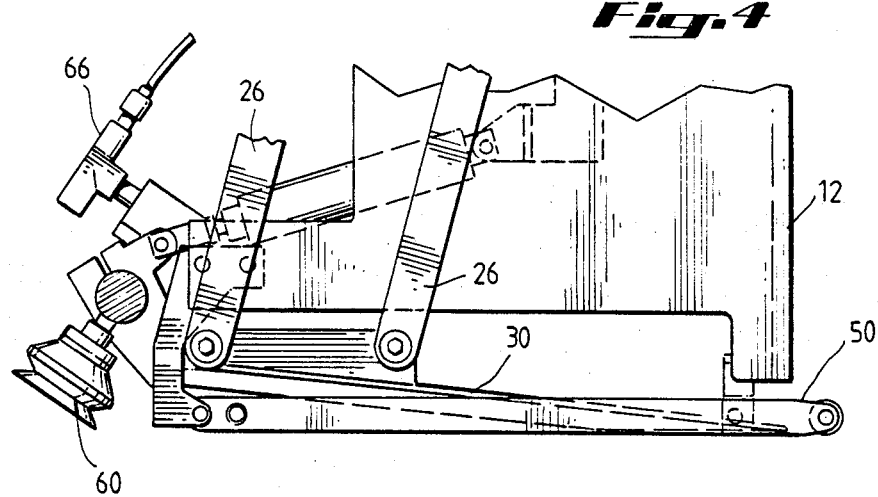
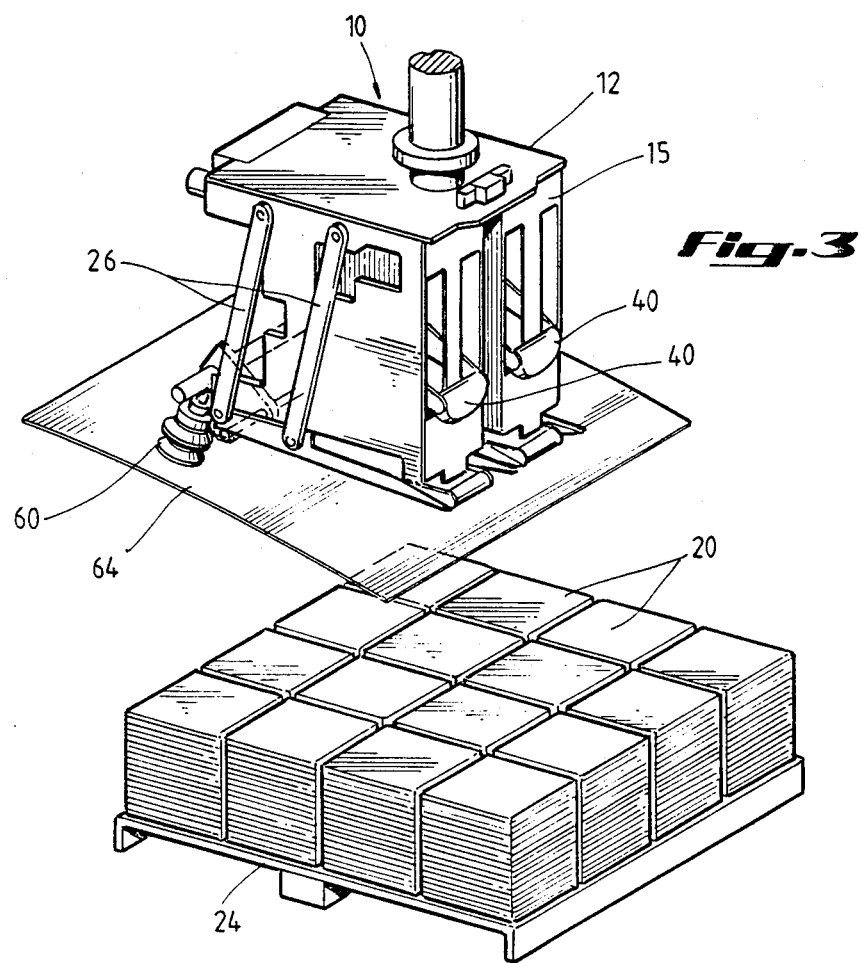

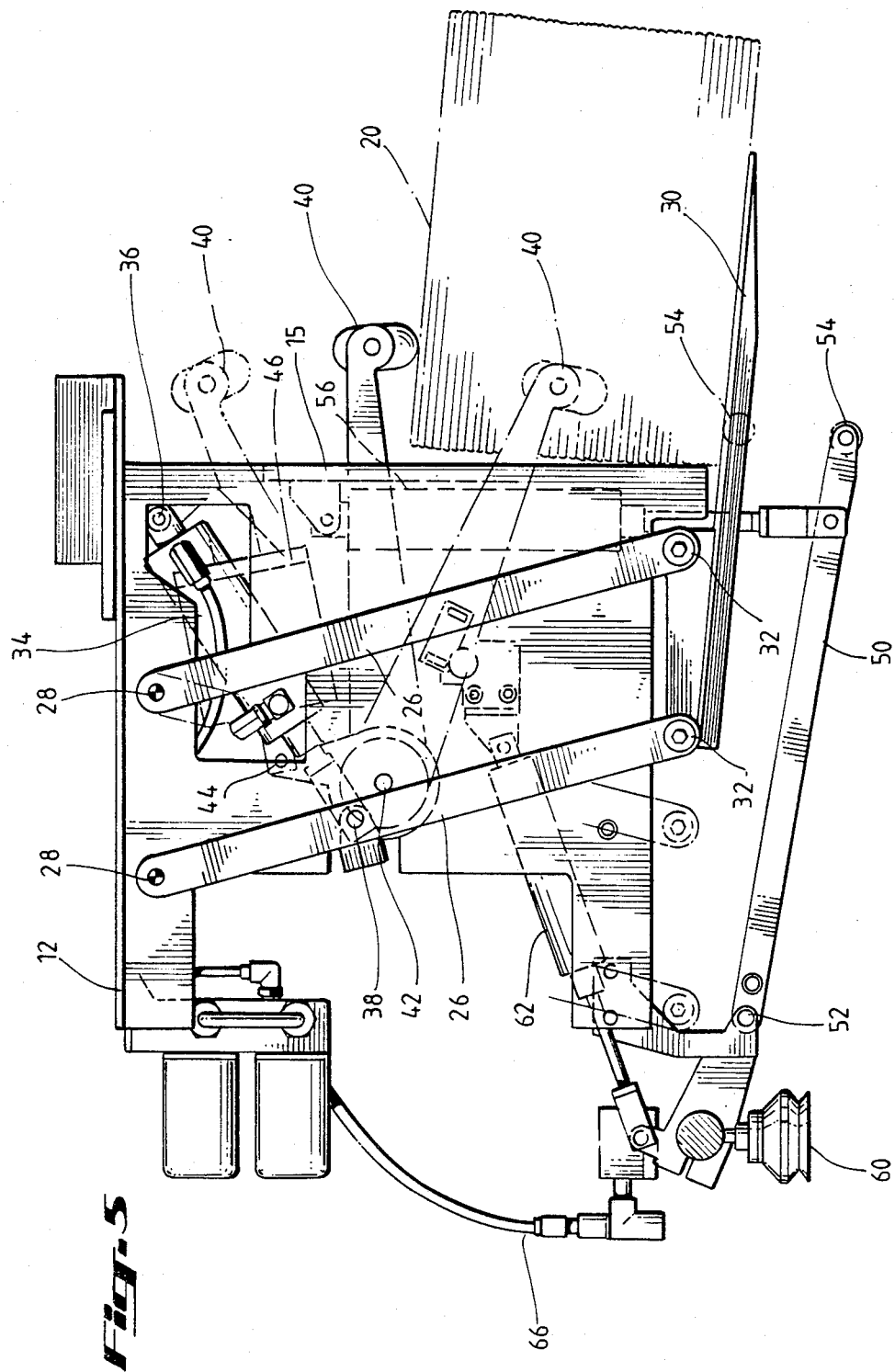

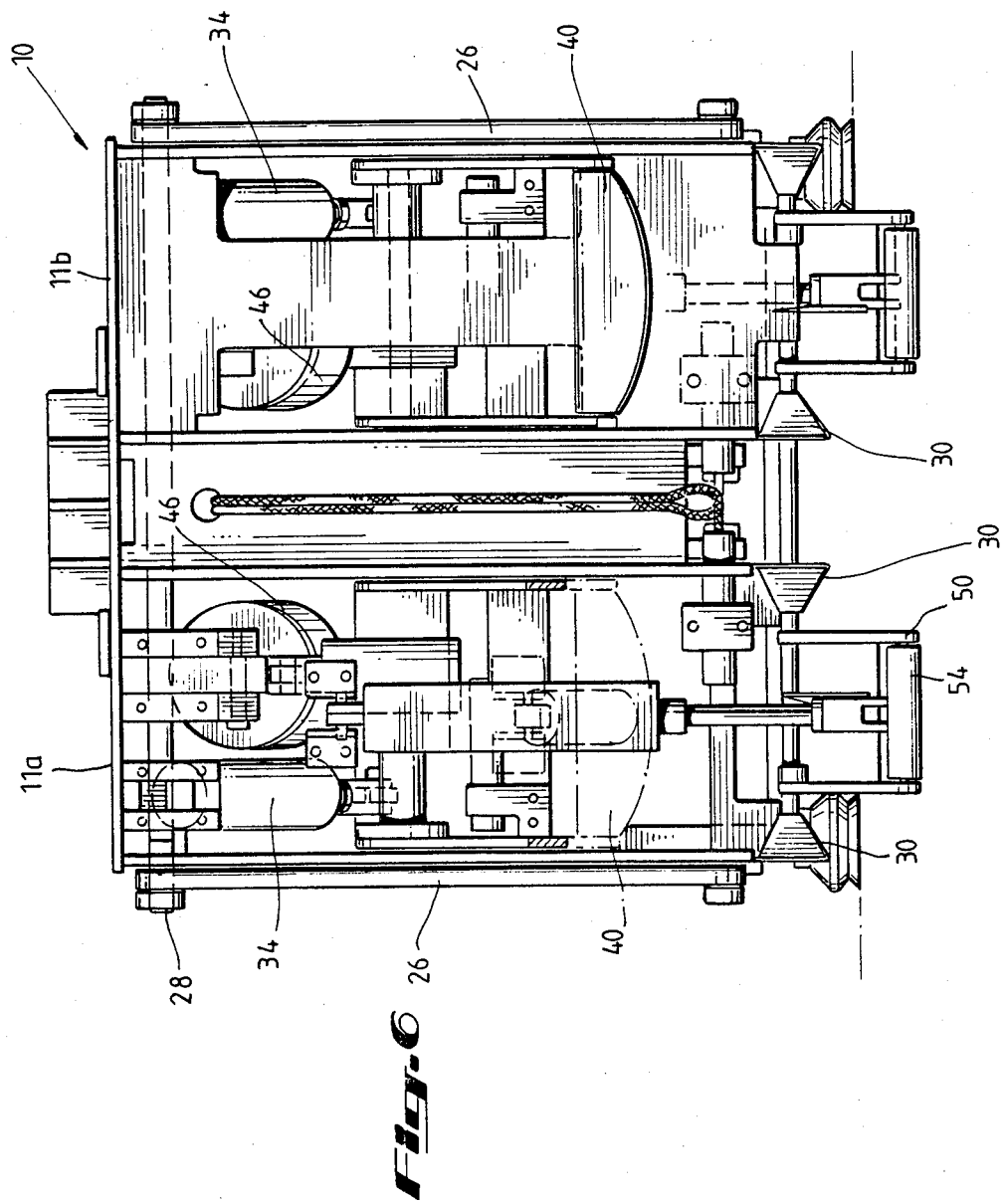

METHOD AND APPARATUS FOR HANDLING STACKS OF LOOSE SHEET MATERIAL

BACKGROUND OF THE INVENTION

The present invention is directed to an apparatus and a method for handling and moving stacks of loose sheet materials such as stacks of sheet paper from one location to a second location. For example, it is desirable to pick up stacks of loose paper from a conveyor in a manufacturing plant and place a plurality of the stacks on a pallet for shipment.

The present invention is directed to a method and apparatus for efficiently handling and moving stacks of loose sheet material from one location to another location in an efficient and mechanized operation, all without allowing the stacks of sheet material to fall apart and without requiring the stacks to be secured together.

SUMMARY

The present invention is directed to an apparatus for handling stacks of loose sheet material and includes a body which is movable vertically, horizontally and rotationally. A pair of parallel arms are pivotally connected to and supported from the body. A pair of forks are pivotally connected to the arms and positioned and movably generally horizontally for engaging and releasing the bottom of a stack of material. Moving means are connected between the body and the arms for extending and retracting the forks. A clamp is positioned above the forks and is movably connected to the body for engaging the top of the material and holding the material between the clamp and the extended forks for allowing the stacks to be moved without securing the loose sheets. Power means are connected to the clamp for moving the clamps towards and away from the forks. A probe lifter is movably connected to the body and is movable between a lower position below the forks and an upper position between the forks for removing the weight of the stack from the forks when the stack has been set down so that the forks can be retracted without disturbing the sheets. Power means are connected to the lifter for moving the lifter from the lower position to the upper position. Preferably, the probe lifter includes a roller at its end for ease of retraction from the bottom of the stack.

Still a further object of the present invention is wherein a vacuum pickup is connected to the body for picking up and depositing a slip sheet for receiving stacks of sheet material. Preferably, the pickup is movably connected to the body and may be lowered and raised.

Still a further object of the present invention is the provision of a method of handling a stack of loose sheet material which includes placing a pair of forks beneath a stack of sheet material, holding the stack between a movable clamp on the top of the stack and the forks, moving the stack to a desired location, transferring a portion of the weight of the stack to a stacking surface, releasing the clamp from the top of the stack, moving a roller upwardly between the forks and against the bottom of the stack to remove the weight of the stack from the forks, retracting the forks downwardly and away from the stack and removing the roller from the bottom of the stack.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is a fragmentary elevational perspective view of the apparatus of the present invention shown in position for picking up a stack of loose sheet materials from a conveyor, FIG. 2 is a fragmentary elevational perspective view showing the present invention depositing stacks of sheet material on a pallet, FIG. 3 is a fragmentary elevational perspective view illustrating the present invention depositing a slip sheet over a plurality of stacks of sheet material, FIG. 4 is a fragmentary enlarged elevational view of the present invention in which the forks are shown in the retracted view, FIG. 5 is an enlarged elevational view of the present invention shown in position for carrying a stack of sheet material, and FIG. 6 is a front elevational view of the present invention.

DESCRIPTION OF THE PREFERRED EMBODIMENT

Referring now to the drawings, and particularly to FIGS. 1 and 2, the handling apparatus of the present invention is generally indicated by the reference numeral 10 and generally includes a body 12 having a front face 15 and which is supported by a shaft 14 so as to be movable vertically, horizontally and rotationally by any suitable support means generally indicated by the reference numeral 16 for picking up one or more stacks of loose sheet material 20 from a conveyor 22 and depositing the stacks at a second location such as on a pallet 24. The problem in attempting to handling and transport stacks of loose sheet material such as paper, which are not tied or secured together, is that the sheets in the stack will slip relative to each other and become unmanageable, particularly when picking up the stack and when depositing the stack. For example, the top and bottom sheets of the stack must be engaged and released by the handling apparatus in a manner which will not disturb their alignment of the sheets in the stack.

The handling apparatus 10, as shown, is a double module so that it can pick up two stacks 20 at a time or only one if so desired. Thus, a first module 11a and a second module 11b may be provided to be actuated in synchronism or separately. However, any number of modules, one or more, may be provided as desired.

Referring now to FIGS. 1, 2, 4, 5 and 6, the mechanism for engaging and releasing the bottom of a stack 20 is best seen. Thus, a pair of parallel arms 26 are pivotally connected and supported from the body 12 at their upper ends around pivot pins 28, and a pair of separated forks 30 are pivotally connected at pivot points 32 to the lower ends of the arm 26. The forks 30 are positioned generally horizontally, but preferably are directed outwardly and downardly at an angle of approximately 5° for engaging and disengaging from a stack 20. Preferably, the lengths of the forks 30 are less than the length of a stack 20 so that the stack 20 may be partially set down on a stacking surface before retracting the forks 30. Power moving means such as a double acting piston and cylinder air assembly 34 is pivotally connected between the body 12 and the arms 26 between points 36 and 38 for extending the forks 30, as best seen in FIG. 5, and for retracting the forks 30 as best seen in FIG. 4. This parallelogram linkage of the arms 26 enhances the ability of the forks 30 to engage and retract from a stack 20 without disturbing the bottom sheet. That is, upon extension of the forks 30, their movement is outwardly and upwardly and on retraction their movement is downwardly and inwardly.

Referring now to FIGS. 2, 5 and 6, a clamp 40 is provided which is pivotally connected to the body 12 around a pivot point 42 and is rotated by an arm 44 which is connected to a double acting piston and cylinder air assembly 46. The clamp 40 is positioned above the forks 30 and is rotatable for engaging the top of a stack 20 and holding a stack 20 of material between the clamp 40 and the forks 30 as best seen in FIG. 5. The clamp 40 can move to various positions, such as shown in FIG. 5, for clamping various heights of stacks 20. It is to be noted that clamp 40 generally engages the top of the stack 20 in a substantially perpendicular engagement and therefore does not disturb the alignment of the top sheet with the remainder of the stack 20. The coaction of the clamp 40 with the forks 30 allows a stack 20 to be securely handled even though the clamp 40 and forks 30 only engage a portion of the length of a stack 20.

The power means 46 is actuated for moving the clamp 40 towards the forks 30 for gripping a stack 20 for movement and after the stack 20 is moved to a desired location moves the clamp 40 away from the forks 30 for releasing the stack 20.

Referring now to FIGS. 4, 5 and 6, probe lifter 50 which is pivotally connected to the body 12 by a pivot pin 52 and is movable between a lower position below the forks 30 as best seen in FIGS. 5 and 6 and an upper position between the forks. The lifter 50 includes a roller 54 at its outer end which is movable upwardly, as best seen in dotted outline in FIG. 5, for removing the weight of the bottom of the stack 20 from the forks 30 so that they may be removed without disturbing the bottom sheet of the stack 20. A power moving means such as a single acting air piston and cylinder assembly 56 is provided connected to the lifter 50 for moving the lifter from its lower position to its upper position. With the roller 54 supporting the weight of a portion of the stack 20, the material handling apparatus 10 may be retracted away from the stack 20 without disturbing its alignment. When the probe lifter 50 contacts a stacking surface, it is moved upwardly and this movement is detected by a proximity switch which can be used to indicate to the operator the actual vertical position of the apparatus 10 to the stacking surface.

Generally, in stacking a plurality of stacks of materials, it is conventional to utilize a slip sheet between various levels of stacks for separating the levels for ease of future handling. Referring now to FIGS. 1, 3 and 4, one or more vacuum pickup cups 60 are provided which are pivotally connected to the body 12 around the pivot point 52 and are raised and lowered by a power means such as a double acting air piston and cylinder assembly 62. In the lower position the body 12 may be maneuvered to place the cups 60 against a slip sheet 64. A vacuum system 66 is connected to the cup 60 for creating a vacuum for picking up a sheet 64 and allowing the body 12 to place the sheet 64 on one level of stacks 20, as best seen in FIG. 3, for receiving additional layers of stacks 20.

In use, as best seen in FIG. 1, the handling apparatus 10 is moved towards the stack or stacks 20 to be picked up and the front face 15 engages the front face of the stack 20 to enhance the accuracy of the stack relative to the apparatus 10. The forks 30 are extended by the air assembly 34 to engage the bottom of the stacks 20. Preferably, the stacks 20 are tilted on the conveyor 22 and the fork enters between the rollers on the conveyor although other conveyor structures may be provided for allowing the forks to enter and engage the bottom of the stacks 20. The clamp 40 is actuated by the air cylinder 46 to move into engagement with the top of the stack 20. Thereafter, the body 12 is maneuvered to remove the stack 20 from the conveyor 22 and move them to a stacking location such as a pallet 24, shown in FIG. 2.

As best seen in FIG. 5 with the probe lifter 24 in the downward position, it will contact the stacking surface, such as the top of the pallet 24, and the body 12 continues downwardly an amount to transfer the back end of the stack 20 onto the pallet in order to transfer as much of the stack weight as possible to the pallet 24 without the forks engaging the pallet and prior to the release of the forks. The clamp 40 is then released and the air cylinder 56 is actuated to move the lifter 50 and roller 52 upwardly between the forks 30 to remove weight from the forks. Actuation of the air cylinder 34 retracts the forks 30 downwardly and away from the bottom of the stack 30 without disturbing the bottom sheet. The body 12 is then retracted away from the stack 20 allowing the remainder of the stack 20 to roll off of the roller 54.

When desired, the vacuum pickup cups 60 may be actuated by the air cylinder 62 and vacuum system 66 to pick up a slip sheet 60 which is carried and placed over one level of stacks 20 for receiving additional layers.

The method of handling loose stacks of sheet material is apparent from the foregoing description of the preferred embodiment and includes placing a pair of forks beneath a stack of loose sheet material, holding the stack between a clamp on the top of the stack and the forks, moving the stack to a desired location, transferring a portion of the weight of the stack to a stacking surface, releasing the clamp from the top of the stack, moving a roller upwardly between the forks and the bottom of the stack to remove the weight of the stacks from the forks, retracting the forks downwardly and away from the stack, and removing the roller from the bottom of the stack.

The present invention, therefore, is well adapted to carry out the objects and attain the ends and advantages mentioned as well as others inherent therein. While a presently preferred embodiment of the invention is given for the purpose of disclosure, numerous changes in the details of construction, arrangement of parts, and steps of the method, will readily suggest themselves to those skilled in the art and which are encompassed within the spirit of the invention and the scope of the appended claims.

What is claimed is:

1. An apparatus for handling stacks of loose sheet material comprising, a movable body having a front face, a pair of parallel arms forming a parallelogram linkage pivotally connected at their upper ends to and supported from the body for movement toward and away from the front face, a pair of forks pivotally connected to the lower ends of the arms and positioned and movable generally horizontally from beneath the body to a position outside of the front face of the body for engaging and releasing only a portion of the bottom of a stack of material, moving means connected between the body and the arms for extending and retracting the forks, a clamp positioned outside of the body and pivotally connected to the body for engaging the top of the stack and holding the stack between the clamp and the extended forks, means connected to the clamp for moving the clamp toward and away from the forks, a probe lifter pivotally connected to the body and positioned outside of the body and movable between a lower position below the forks and an upper position between the extended forks for removing the weight of the stack from the forks, said lifter including a roller, and means connected to the lifter for moving the lifter from the lower position to the upper position.

2. The apparatus of claim 1 including, a vacuum pickup connected to the body for picking up and depositing a slip sheet.

3. The apparatus of claim 2 wherein the pickup is movably connected to the body, and means connected to the pickup for lowering and raising the pickup.

4. The apparatus of claim 1 wherein the forks are directed downwardly and outwardly at an angle of approximately 5 degrees.

5. The method of handling a stack of loose sheet material comprising, placing a pair of forks beneath a portion of the stack of sheet material, holding the stack between a clamp on the top of the stack and the forks, moving the stack to a desired location, transferring a portion of the weight of the stack to a stacking surface, releasing the clamp from the top of the stack, moving a roller upwardly between the forks and against the bottom of the stack to remove the weight of the stack from the forks, retracting the forks downwardly and away from the stack, and removing the roller from the bottom of the stack.

* * * * *